United States Patent
Kawaguchi et al.

(10) Patent No.: US 12,106,875 B2
(45) Date of Patent: Oct. 1, 2024

(54) WIRE HARNESS

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Daichi Kawaguchi, Yokkaichi (JP); Masahiro Hagi, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 136 days.

(21) Appl. No.: 17/915,141

(22) PCT Filed: Mar. 23, 2021

(86) PCT No.: PCT/JP2021/011859
§ 371 (c)(1),
(2) Date: Sep. 28, 2022

(87) PCT Pub. No.: WO2021/210355
PCT Pub. Date: Oct. 21, 2021

(65) Prior Publication Data
US 2023/0154646 A1   May 18, 2023

(30) Foreign Application Priority Data
Apr. 15, 2020   (JP) ................... 2020-072897

(51) Int. Cl.
H01B 7/08   (2006.01)
H01B 7/04   (2006.01)
H02G 3/04   (2006.01)

(52) U.S. Cl.
CPC ............ *H01B 7/0876* (2013.01); *H01B 7/04* (2013.01); *H02G 3/0418* (2013.01)

(58) Field of Classification Search
None
See application file for complete search history.

(56) References Cited

U.S. PATENT DOCUMENTS

| | | | | |
|---|---|---|---|---|
| 1,750,533 A | * | 3/1930 | Ludorf | D03D 3/06 |
| | | | | 139/386 |
| 4,158,104 A | * | 6/1979 | Ross | H01B 7/083 |
| | | | | 338/210 |

(Continued)

FOREIGN PATENT DOCUMENTS

| | | | | |
|---|---|---|---|---|
| EP | 272211 A | * | 6/1988 | ........... H01B 7/0876 |
| JP | 2006-236860 A | | 9/2006 | |

(Continued)

OTHER PUBLICATIONS

Jun. 22, 2021 International Search Report issued in International Patent Application No. PCT/JP2021/011859.

*Primary Examiner* — Krystal Robinson
(74) *Attorney, Agent, or Firm* — Oliff PLC

(57) ABSTRACT

A wire harness including: a core wire having a flat straight section whose vertical height is smaller than a width thereof and a bend bent from an end of the straight section, wherein: the straight section is formed from a second assembled wire obtained by twisting or braiding together first assembled wires which are each obtained by twisting or braiding wire (Continued)

strands, and the bend is formed from a plurality of adjacent wires arranged adjacently in a direction orthogonal to a vertical direction.

4 Claims, 2 Drawing Sheets

(56) References Cited

U.S. PATENT DOCUMENTS

| | | | | |
|---|---|---|---|---|
| 4,381,426 A * | 4/1983 | Cronkite | ................ | H01B 11/04 |
| | | | | 57/204 |
| 4,777,325 A * | 10/1988 | Siwinski | .............. | H01B 7/0876 |
| | | | | 174/113 AS |
| 6,476,329 B2 * | 11/2002 | Tsukamoto | .......... | H01B 7/0876 |
| | | | | 174/117 F |
| 10,410,768 B2 * | 9/2019 | Buck | ....................... | H01B 11/02 |
| 2002/0046869 A1 * | 4/2002 | Shimizu | ............... | H01B 7/0846 |
| | | | | 174/117 F |
| 2002/0144837 A1 * | 10/2002 | Yamamoto | ........... | H01B 7/0876 |
| | | | | 174/117 F |

FOREIGN PATENT DOCUMENTS

| | | |
|---|---|---|
| JP | 2012-125079 A | 6/2012 |
| JP | 2016-195078 A | 11/2016 |
| JP | 2020-4525 A | 1/2020 |

* cited by examiner

WIRE HARNESS

BACKGROUND

The present disclosure relates to a wire harness.

Conventionally, there are wire harnesses provided in vehicles and the like that have a flat electrical wire with a flat shape which is covered in a state where wire strands of the core wire are adjacently arranged in parallel, and part of the flat electrical wire is bent (e.g., see JP 2012-125079A). Specifically, with such a wire harness, the core wire of the flat electrical wire includes a straight section that is disposed in such a manner that the vertical height is smaller than the width and a bent section bent from an end portion of the straight section as seen vertically. Also, in the bent section of this wire harness, the flat surface of the flat electrical wire is twisted, and a plurality of bent sections hold each other in that state.

SUMMARY

However, with the wire harness described above, even though the height is suppressed by arranging the wire strands in the straight section adjacent to each other in a direction orthogonal to the vertical direction, the wire strands in the bent section are arranged adjacently in the vertical direction with the flat surface of the flat electrical wire being twisted, and thus there is a problem in that the maximum height of the wire harness increases in the bent section.

An exemplary aspect of the disclosure provides a wire harness capable of keeping a low height profile.

The wire harness of the present disclosure is a wire harness including a core wire having a flat straight section whose vertical height is smaller than a width thereof and a bend bent from an end of the straight section, the straight section being formed from a second assembled wire obtained by twisting or braiding together first assembled wires which are each obtained by twisting or braiding wire strands, and the bend being formed from a plurality of adjacent wires arranged adjacently in a direction orthogonal to a vertical direction.

According to a wire harness of the present disclosure, it is possible to keep a low height profile.

DETAILED DESCRIPTION OF EMBODIMENTS

Description of Embodiments of Disclosure

Figure 1:
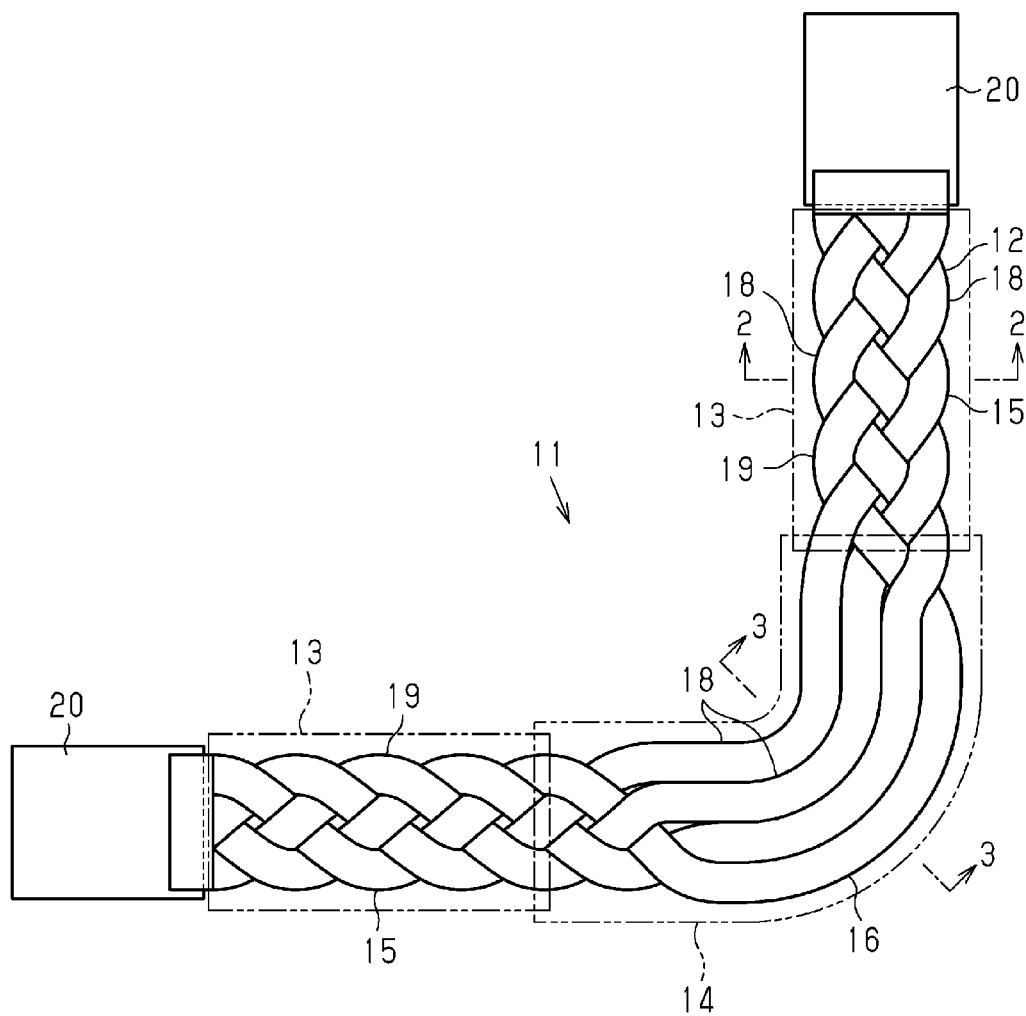
FIG. 1 is a plan view of a wire harness in one embodiment.

Initially, modes of the present disclosure will be enumerated and described.

A wire harness of the present disclosure is:

[1] A wire harness including a core wire having a flat straight section whose vertical height is smaller than a width thereof and a bent section bent from an end portion of the straight section as seen vertically, the straight section being formed from a second assembled wire obtained by twisting or braiding together first assembled wires which are each obtained by twisting or braiding wire strands, and the bent section being formed from a plurality of adjacent wires arranged adjacently in a direction orthogonal to the vertical direction.

According to this configuration, the straight section is formed from a second assembled wire obtained by twisting or braiding together first assembled wires which are each obtained by twisting or braiding wire strands, and the bent section is formed from a plurality of adjacent wires arranged adjacently in a direction orthogonal to the vertical direction, and thus the maximum height of the wire harness increasing in the bent section can be suppressed. That is, a configuration is adopted in which the flat second assembled wire is used in the straight section, and, in the bent section, the second assembled wire is separated into a plurality of adjacent wires that are then arranged adjacently in a direction orthogonal to the vertical direction, and thus the wire strands being stacked vertically in the bent section can be suppressed, and the maximum height of the wire harness can be kept low.

[2] Preferably, the adjacent wires are the first assembled wires.

According to this configuration, the adjacent wires are the first assembled wires, and are thus constituted by simply undoing the second assembled wire obtained by twisting or braiding together the first assembled wires, and the maximum height of the wire harness can be kept low with a simple configuration, compared to the case where the adjacent wires have a different configuration from the first assembled wires, for example.

[3] Preferably, the adjacent wires are shorter in length as a bend radius decreases.

According to this configuration, the adjacent wires are shorter in length as the bend radius decreases, and thus, for example, the lengths of the adjacent wires that have shorter bend radii being excessively long is suppressed, and the bent section increasing in height due to the excess portions bowing vertically is suppressed.

[4] Preferably, the wire harness includes an insulating exterior material covering the straight section while also holding the twisted or braided state of the first assembled wires in the straight section.

According to this configuration, the wire harness includes an insulating exterior material that covers the straight section while also holding the twisted or braided state of the first assembled wires in the straight section, and thus insulation of the straight section is ensured together with maintaining the shape of the straight section. That is, in the straight section, the twisting or braiding tends to unravel when the twisted or braided state of the first assembled wires is released at the boundary with the bent section, but this unraveling is suppressed by the insulating exterior material and the shape of the straight section is maintained.

[5] Preferably, the wire harness includes an insulating protective material with flexibility that covers the bent section.

According to this configuration, an insulating protective material with flexibility that covers the bent section is provided, and thus insulation of the bent section is easily ensured. That is, the insulating protective material with flexibility is used as the material for covering the bent section, and thus slight differences in the shape of the bent section can also be easily accommodated, compared to an exterior material of predetermined shape that has poor flexibility, for example, and the bent section can be easily covered in post-processing, after the bent section has been bent.

Detailed Description of Embodiments of Disclosure

Specific examples of a wire harness of the present disclosure will be described below with reference to the drawings. Note that the present disclosure is not limited to these illustrative examples and is defined by the claims, and all changes that come within the meaning and range of equivalency of the claims are intended to be embraced therein.

As shown in FIG. 1, a wire harness 11 includes a core wire 12, an insulating exterior material 13 covering the core wire 12, and an insulating protective material 14.

The core wire 12 includes a flat straight section 15 whose vertical height is smaller than the width thereof, and a bent section 16 (bend) bent from an end portion of the straight section 15 as seen vertically. Note that the vertical direction is a direction corresponding to a direction orthogonal to the surface of the page of FIG. 1, and the width of the straight section 15 is the length in a direction orthogonal to the extending direction of the straight section 15 as seen vertically. Also, the core wire 12 of the present embodiment includes two straight sections 15 that are joined via the bent section 16, and the two straight sections 15 extend in directions that form an angle of 90 degrees with each other, with the bent section 16 as the origin as seen vertically.

Figure 2:
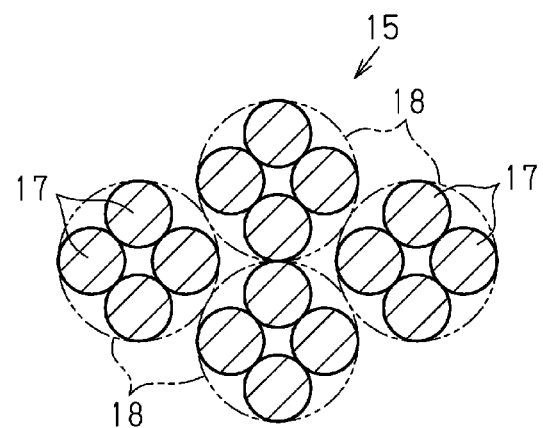
FIG. 2 is a cross-sectional view taken along 2-2 of FIG. 1 in one embodiment.

As shown in FIGS. 1 and 2, the straight sections 15 are each formed from a braided wire 19 serving as a second assembled wire obtained by braiding together twisted wires 18 serving as the first assembled wires which are each obtained by twisting wire strands 17. Specifically, the braided wire 19 constituting each straight section 15 of the present embodiment is obtained by braiding together four twisted wires 18 in such a manner as to be in a flat state. Also, the twisted wires 18 are each obtained by twisting four wire strands 17 in a rotation direction around an axis in the extending direction thereof. Note that, in FIG. 1, the boundaries between the wire strands 17 in a single twisted wire 18 are not illustrated, and the core wire 12 is illustrated in such a manner that the boundaries between the twisted wires 18 are easily ascertained visually.

Figure 3:
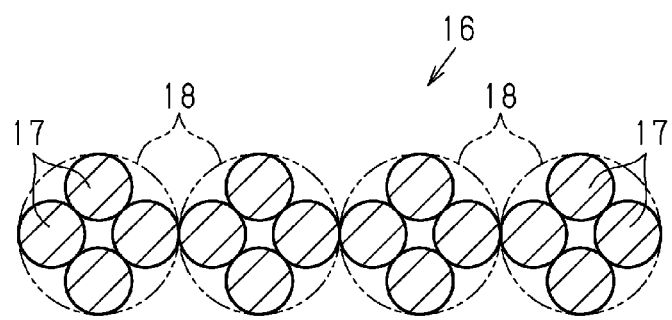
FIG. 3 is a cross-sectional view taken along 3-3 of FIG. 1 in one embodiment.

As shown in FIGS. 1 and 3, the bent section 16 is formed from a plurality of twisted wires 18 serving as adjacent wires arranged adjacently in a direction orthogonal to the vertical direction. Specifically, the bent section 16 of the present embodiment is formed from four twisted wires 18 having a configuration obtained by undoing the braided wire 19 constituting the straight section 15, and is obtained by these four twisted wires 18 being bent while arranged adjacently in a direction orthogonal to the vertical direction with substantially no gaps therebetween. Also, the four twisted wires 18 in the bent section 16 of the present embodiment are set to be shorter in length as the bend radius decreases.

The insulating exterior material 13 is, for example, obtained by assembling a pair of upper and lower resin molded articles, and covers the straight section 15 while also holding the braided state of the twisted wires 18 in the straight section 15. Specifically, the insulating exterior material 13 is provided so as to sandwich the straight section 15 up to the boundary with the bent section 16 which is the end portion of the straight section 15, and holds the braided state of the twisted wires 18 up to the boundary with the bent section 16.

The insulating protective material 14 is, for example, obtained by laminating a pair of upper and lower plastic films, and covers the bent section 16 while also having flexibility. The insulating protective material 14 is provided so as to cover the bent section 16 in post-processing, after the bent section 16 has been bent.

Also, the wire harness 11 includes a metal terminal 20 welded to end portions of the straight sections 15 which are the two end portions of the core wire 12. The metal terminals 20 of the wire harness 11 are then connected to other external terminals (not shown) connected to an electrical device, for example.

Next, operation of the wire harness 11 configured as described above will be described.

The core wire 12 of the wire harness 11 has the straight sections 15 and the bent section 16, and thus, for example, other external terminals that are not in a straight line can be electrically connected to each other. Also, the core wire 12 includes the twisted wires 18 obtained by twisting the wire strands 17, and thus the wire strands 17 tend not to unravel, have excellent flexibility and performance such as tensile strength is improved, compared to the case where the wire strands 17 are simply provided in parallel with each other, for example.

Next, effects of the above embodiment will be described hereinafter.

(1) The straight sections 15 are each formed from the braided wire 19 serving as the second assembled wire obtained by braiding together the twisted wires 18 serving as the first assembled wires which are each obtained by twisting the wire strands 17, and the bent section 16 is formed from the twisted wires 18 serving as the plurality of adjacent wires being arranged adjacently in a direction orthogonal to the vertical direction, and thus the maximum height of the wire harness 11 increasing in the bent section 16 can be suppressed. That is, the flat braided wire 19 is used in the straight section 15, and in the bent section 16, the braided wire 19 is separated into the plurality of twisted wires 18 that are then arranged adjacently in a direction orthogonal to the vertical direction, and thus the twisted wires 18 being stacked vertically in the bent section 16 can be suppressed, and the maximum height of the wire harness 11 can be kept low.

(2) The adjacent wires constituting the bent section 16 are the twisted wires 18, and are thus constituted by simply undoing the braided wire 19 obtained by braiding the twisted wires 18, and the maximum height of the wire harness 11 can be kept low with a simple configuration, compared to the case where the adjacent wires have a different configuration from the twisted wires 18, for example.

(3) The plurality of twisted wires 18 in the bent section 16 are shorter in length as the bend radius decreases, and thus, for example, the lengths of the twisted wires 18 having shorter bend radii being excessively long is suppressed, and the bent section 16 increasing in height due to the excess portions bowing vertically is suppressed.

(4) The wire harness 11 includes the insulating exterior material 13 that covers the straight sections 15 while also holding the braided state of the twisted wires 18 in the straight sections 15, and thus insulation of the straight sections 15 is ensured together with maintaining the shape of the straight sections 15. That is, in the straight sections 15, the twisting or braiding tends to unravel when the twisted or braided state of the twisted wires 18 is released at the boundary with the bent section 16, but this unraveling is suppressed by the insulating exterior material 13 and the braided shape of the straight sections 15 is maintained.

(5) The wire harness 11 includes the insulating protective material 14 with flexibility that covers the bent section 16, and thus insulation of the bent section 16 is easily ensured. That is, the insulating protective material 14 with flexibility is used as the material for covering the bent section 16, and thus slight differences in the shape of the bent section 16 can also be easily accommodated, compared to an exterior material of predetermined shape that has poor flexibility, for example, and the bent section 16 can be easily covered in post-processing, after the bent section 16 has been bent.

The present embodiment can be modified and implemented as follows. The present embodiment and the following modification examples can be implemented in combination with each other as long as there are no technological incompatibilities.

In the above embodiment, the adjacent wires constituting the bent section 16 are the twisted wires 18 obtained by simply undoing the braided wire 19 which is obtained by braiding the twisted wires 18, but are not limited thereto, and may be adjacent wires having a different configuration from the twisted wires 18. That is, the bent section 16 need only be formed from a plurality of adjacent wires separated out from the braided wire 19 and arranged adjacently in a direction orthogonal to the vertical direction, and may, for example, be a plurality of adjacent wires obtained by further twisting or braiding the plurality of twisted wires 18 or may be a plurality of adjacent wires obtained by one twisted wire 18 being separated into two or more wire strands that are then twisted or braided.

In the above embodiment, the twisted wires 18 in the bent section 16 are set to be shorter in length as the bend radius decreases, but are not limited thereto, and may have other configurations. For example, a configuration may be adopted in which the twisted wires 18 in the bent section 16 have the same length and are arranged adjacently with gaps therebetween in a direction orthogonal to the vertical direction. In this case, the excess length can be absorbed by the gaps.

In the above embodiment, the insulating exterior material 13 that covers the straight sections 15 while also holding the braided state of the twisted wires 18 in the straight sections 15 is provided, but is not limited thereto, and, for example, the insulating exterior material 13 may not have the function of holding the braided state of the twisted wires 18. Note that, in this case, for example, the braided state of the twisted wires 18 is preferably held by the boundary with the bent section 16 in each straight section 15 being fixed by crimping with a crimping band or hardened by welding.

In the above embodiment, the insulating protective material 14 with flexibility that covers the bent section 16 is provided, but is not limited thereto, and, for example, an exterior material having a predetermined shape with not much flexibility may be provided instead.

In the above embodiment, the straight sections 15 are formed from the braided wire 19 serving as the second assembled wire obtained by braiding together the twisted wires 18 serving as the first assembled wires which are each obtained by twisting the wire strands 17, but the first assembled wires may be braided wires obtained by braiding the wire strands 17, and the second assembled wire may be a twisted wire obtained by twisting together the first assembled wires. Note that, in cases such as where the second assembled wire is a twisted wire obtained by twisting the first assembled wires together, a flat straight section whose vertical height is smaller than the width thereof may be obtained by flattening the second assembled wire vertically, for example.

In the above embodiment, the braided wire 19 constituting the straight sections 15 is obtained by braiding together four twisted wires 18 serving as the first assembled wires, but is not limited thereto, and may, for example, be obtained by braiding together first assembled wires of another number such as six or eight.

In the above embodiment, the twisted wires 18 serving as the first assembled wires are each obtained by twisting four wire strands 17, but are not limited thereto, and may, for example, be obtained by twisting wire strands 17 of another number such as eight or a dozen or more.

In the above embodiment, the core wire 12 has a configuration in which two straight sections 15 that are joined via the bent section 16 extend in directions that form an angle of 90 degrees with each other, with the bent section 16 as the origin as seen vertically, but is not limited thereto, and the straight sections may extend at other angles. That is, the degree of bending of the bent section 16 may be changed.

In the above embodiment, the core wire 12 includes two straight sections 15 that are joined via the bent section 16, but is not limited thereto, and may be configured as a core wire formed from one straight section 15 and one bent section 16.

The present disclosure encompasses the following implementation examples. Reference numerals of the constituent elements of the embodiment are given not for limitation purposes but to facilitate understanding.

[Note 1] A wire harness (11) including:
a core wire (12) formed from a plurality of assembled wires (18),
wherein the assembled wires (18) each include a plurality of wire strands (17) twisted or braided together, and
the core wire (12) includes:
two end regions (straight sections 15) respectively including a first end and a second end of the core wire (12), and in which the plurality of assembled wires (18) are twisted or braided; and
an intermediate region (bent section 16) between the two end regions (15), and in which the plurality of assembled wires (18) are arranged side by side in a width direction.

[Note 2] In one or more implementation examples of the present disclosure, the wire harness (11) may further include a fixing member (crimping band) for holding the twisted or braided state of the plurality of assembled wires (18) at a boundary between each of the end regions (15) and the intermediate region.

[Note 3] In one or more implementation examples of the present disclosure, the wire harness (11) may further include two metal terminals (20) to which the first end and the second end are respectively connected.

[Note 4] In one or more implementation examples of the present disclosure, the end regions (15) may each extend linearly.

[Note 5] In one or more implementation examples of the present disclosure, the plurality of assembled wires (18) may extend continuously from the first end to the second end.

[Note 6] In one or more implementation examples of the present disclosure, the plurality of assembled wires (18) may be arranged side by side in the width direction in the intermediate region (16) without being twisted or braided.

[Note 7] In one or more implementation examples of the present disclosure, the intermediate region (16) may curve in a circular arc shape.

[Note 8] In one or more implementation examples of the present disclosure, in the intermediate region (16), the assembled wires (18) located on an outer diameter side of the curve may be longer in length than the assembled wires (18) located on an inner diameter side of the curve.

[Note 9] In one or more implementation examples of the present disclosure, the wire harness (11) may further include two pieces of insulating exterior material (13) respectively covering the two end regions (15).

[Note 10] In one or more implementation examples of the present disclosure, the wire harness (11) may further include an insulating protective material (14) covering the intermediate region (16), and curving along a shape of the intermediate region (16).

The invention claimed is:

1. A wire harness comprising:
   a core wire having a flat straight section whose vertical height is smaller than a width thereof and a bend section that is bent from an end of the straight section, wherein:
   the straight section of the core wire is formed from a second assembled wire obtained only by twisting or braiding together first wires, each of the first wires being obtained by twisting or braiding elemental wire strands, and
   the bend section of the core wire is formed only by untwisting or unbraiding the first wires from the end of the straight section so that the first wires in the bend section are arranged adjacently to each other in a direction orthogonal to a vertical direction.

2. The wire harness according to claim 1,
   wherein the first wires in the bend section that are arranged adjacently are shorter in length as a bend radius decreases.

3. The wire harness according to claim 1, comprising:
   an insulating exterior material covering the straight section while also holding a twisted or braided state of the first wires in the straight section.

4. The wire harness according to claim 1, comprising:
   an insulating protective material with flexibility that covers the bend section.

* * * * *